(12) United States Patent
Backmann et al.

(10) Patent No.: US 9,169,098 B2
(45) Date of Patent: Oct. 27, 2015

(54) DEVIATION DEVICE FOR A WEB OF FILM

(75) Inventors: Martin Backmann, Lengerich (DE); Juergen Linkies, Lienen (DE); Ingo Putsch, Lengerich (DE)

(73) Assignee: WINDMOELLER & HOELSCHER KG, Lengerich (DE)

( * ) Notice: Subject to any disclaimer, the term of this patent is extended or adjusted under 35 U.S.C. 154(b) by 135 days.

(21) Appl. No.: 11/920,166

(22) PCT Filed: May 19, 2006

(86) PCT No.: PCT/EP2006/004834
§ 371 (c)(1),
(2), (4) Date: Nov. 9, 2007

(87) PCT Pub. No.: WO2006/125586
PCT Pub. Date: Nov. 30, 2006

(65) Prior Publication Data
US 2009/0072075 A1 Mar. 19, 2009

(30) Foreign Application Priority Data

May 23, 2005 (DE) .......................... 10 2005 024 136
Jul. 30, 2005 (DE) .......................... 10 2005 035 750

(51) Int. Cl.
| | |
|---|---|
| B65H 23/24 | (2006.01) |
| B65H 23/32 | (2006.01) |
| B29C 47/34 | (2006.01) |
| B29C 47/94 | (2006.01) |
| B29C 47/00 | (2006.01) |
| B29K 105/00 | (2006.01) |
| B29L 23/00 | (2006.01) |

(52) U.S. Cl.
CPC ................ *B65H 23/32* (2013.01); *B29C 47/34* (2013.01); *B29C 47/94* (2013.01); *B29C 47/0026* (2013.01); *B29C 47/0057* (2013.01); *B29C 47/0059* (2013.01); *B29K 2105/256* (2013.01); *B29K 2105/258* (2013.01); *B29L 2023/001* (2013.01); *B65H 2406/111* (2013.01); *B65H 2701/1752* (2013.01)

(58) Field of Classification Search
CPC ............. B65H 23/32; B65H 2406/111; B65H 2701/1752; B29C 47/34; B29C 47/94; B29C 47/0026; B29C 47/0057; B29C 47/0059; B29K 2105/256; B29K 2105/258; B29L 2023/001
USPC ................ 242/615.1, 615.11, 615.12, 615.2, 242/615.21, 615.3, 615.4, 613, 613.1; 425/326.1, 72.1, 363
See application file for complete search history.

(56) References Cited

U.S. PATENT DOCUMENTS

| | | | |
|---|---|---|---|
| 3,078,352 A | * | 2/1963 | Fay ................................. 360/84 |
| 4,246,212 A | * | 1/1981 | Upmeier et al. ............. 264/40.1 |

(Continued)

FOREIGN PATENT DOCUMENTS

| | | |
|---|---|---|
| CA | 2 179 438 | 12/1996 |
| DE | 25 40 788 | 4/1976 |

(Continued)

*Primary Examiner* — William A Rivera
(74) *Attorney, Agent, or Firm* — Jacobson Holman, PLLC.

(57) ABSTRACT

A deviation device for a film web has at least one deviation element, which operatively interacts with the film web at the point of deviation of the film web and guides the film web on an air cushion. The deviation element can be rotated and has a drive device, which sets the deviation element into rotation so that the peripheral speed of the deviation element differs from the transport speed of the film web.

9 Claims, 2 Drawing Sheets

(56) References Cited

U.S. PATENT DOCUMENTS

| | | | |
|---|---|---|---|
| 4,605,146 A | | 8/1986 | Petitjean |
| 4,676,728 A | * | 6/1987 | Planeta ............... 425/387.1 |
| 4,836,129 A | * | 6/1989 | Dahlgren ................... 118/46 |
| 5,384,080 A | * | 1/1995 | Feistkorn et al. ........... 264/40.6 |
| 5,674,540 A | * | 10/1997 | Sensen et al. ............... 425/72.1 |
| 5,700,488 A | * | 12/1997 | Cree et al. ................. 425/72.1 |
| 5,830,275 A | | 11/1998 | Reich |
| 6,007,013 A | | 12/1999 | Schlatter et al. |
| 6,398,534 B1 | | 6/2002 | Faehling et al. |
| 6,409,494 B1 | | 6/2002 | Voss |
| 7,158,855 B2 | | 1/2007 | Paetzold |
| 7,255,302 B2 | * | 8/2007 | Shearer et al. ........... 242/615.21 |
| 7,445,443 B2 | * | 11/2008 | Meyer ......................... 425/445 |
| 2003/0046787 A1 | * | 3/2003 | Howard ........................ 15/308 |

FOREIGN PATENT DOCUMENTS

| | | |
|---|---|---|
| DE | 44 40 647 A1 | 5/1996 |
| DE | 196 05 904 A1 | 8/1996 |
| DE | 195 22 318 A1 | 1/1997 |
| DE | 297 04 833 U1 | 4/1997 |
| DE | 197 51 417 C1 | 6/1999 |
| DE | 198 23 304 A1 | 12/1999 |
| DE | 298 17 800 U1 | 2/2000 |
| DE | 102 44 869 A1 | 4/2004 |
| DE | 20 2004 010 548 U1 | 9/2004 |
| EP | 0 347 499 A1 | 12/1989 |
| EP | 0 749 823 A1 | 12/1996 |
| GB | 1 531 756 | 11/1978 |

* cited by examiner

DEVIATION DEVICE FOR A WEB OF FILM

CROSS-REFERENCE TO RELATED APPLICATION

This is a national phase of International Application No. PCT/EP2006/004834 filed on May 19, 2006.

BACKGROUND OF THE INVENTION

1. Field of Invention

The invention relates to a deviation device for a film web and a method for deviating a film web.

2. Description of the Prior Art

Deviation devices of this type are used in plants for sometimes producing a large number of film webs. Such a plant has been described in DE 102 44 869 A1 by way of example. The plant described in the aforementioned document is a so-called blown film extrusion plant, using which tubular film webs can be produced at least initially. These tubular film webs are guided over different deviation devices and later wound up directly in the form of film tubes or first separated into film webs and then wound up. However, such deviation devices are also used in plants used to produce flat films. The components of such flat film extrusion plants have been described in DE 198 23 304 A1. The film webs produced using such plants are also guided over different deviation devices and later wound up. Deviation devices are naturally also used in many other film-producing or film-processing plants and machines.

In deviation devices disclosed in the prior art, deviation elements are used, which operatively interact with the film web. The term "deviate" within the meaning of the invention is also meant to connote a "zero deviation." This means that the film is not deviated out of its transport plane. In the case of "zero deviation," a deviation device serves to guide the film web. The deviation elements are frequently in direct contact with the film web. However, deviation devices must also be enabled to guide or divert those film webs, which have at least a touch-sensitive surface. In order to prevent these surfaces from getting damaged or otherwise affected, the film web is guided, at least partly, in a contactless manner over the deviation devices. It has been observed that the concept of building up an air cushion between the deviation element and the film web is very suitable for this purpose. The patent application DE 44 40 647 A1 of the applicant of this patent discloses a deviation element, which is provided with openings or bores, from which a fluid, preferably air, flows out, which is present under excess pressure in the interior of the deviation element. In this way, an air cushion is created between the deviation element and the film web.

One particular problem encountered in the disclosed deviation elements that guide a film web on an air cushion is that it is often not possible to create a uniform air cushion due to the finite number of openings or bores on the deviation element, as a result of which the film could develop folds or come into contact with the deviation element.

SUMMARY OF THE INVENTION

The object of the present invention is to provide an improved deviation device using which the film web can be guided without any loss in quality as far as possible.

This object is achieved with a deviation element as described herein.

Thus, the deviation element can be rotated and it comprises a drive device, using which the deviation element is set into rotation. The peripheral speed of the deviation element differs from the transport speed of the film web. In this way, an air cushion is created on the outer surface of the deviation element as described below. Air layers adhere to the rotating deviation element and/or the film web thus giving rise to a laminar airflow at different speeds between the deviation element and the film web. The laminar airflow is stationary and stable in such a way that the film web is prevented from contacting the deviation element. The film web is thus carried on an air cushion created by the laminar airflow. Another advantage of the deviation device of the invention is that the air cushion is very uniform in the direction extending transversely to the transport direction of the film web. On the whole, the film web can be guided using the deviation device of the invention such that the surface of the film web is effectively prevented from getting damaged.

Another advantage of the deviation device of the invention is that it can be produced and operated economically. The functioning of the deviation element is not bound to definite materials, thus making it possible to also select economical materials such as metal or plastic for example. Such a deviation element also need not be machined further in order to provide it, for example, with bores or openings. The operation of the deviation element merely requires a simple drive motor, for example, an electric motor. It is also possible to drive several deviation elements by using one drive device. A pneumatic source can be dispensed with during the operation of the deviation device of the invention.

In an advantageous embodiment, the value of the peripheral speed of the deviation element is greater than that of the transport speed of the film web. In this way, the laminar flow creating the air cushion adheres to the deviation element. The peripheral speed of the deviation element can be adjusted or changed more easily than the transport speed of the film web, the latter being controlled in most cases by other elements present in the plants described in the introduction. It is thus easily possible to adjust the relative speed, i.e. the difference between the peripheral speed of the deviation element and the transport speed of the film web, required for proper functioning of the deviation device.

The deviation device of the invention is particularly effective if the direction of rotation of the deviation element is opposite to the transport direction of the film web at the point of deviation. Thus the directions of the speed vectors of the deviation element and the film web are directed against each other at the point of deviation. Due to this measure, the value of the peripheral speed of the deviation element can be selected such that it differs from what would be the case if the directions of the speed vectors were identical.

The peripheral speed of the deviation element amounts to at least 10 m/s in an advantageous embodiment of the invention. It is particularly advantageous if this speed lies in the range of 20 m/s and 30 m/s. However, it may also be necessary to select a speed that is greater than 30 m/s in order to guide a film web.

The quality of the air cushion can also be improved using additional measures. Thus in an advantageous refinement of the deviation device of the invention, the outer surface of the deviation element, along which surface the film web is guided, can be designed to be particularly smooth in order to create a laminar airflow without any stalls or separation in the flow as far as possible. This goal can be achieved by providing the deviation element with a chromium layer 14. A predefined measure of the roughness depth of the outer surface of the deviation element can be achieved independently of the chromium layer or also in combination therewith. A maximum roughness depth of 0.5 micrometers and 0.2 micrometers in particular, is considered to be especially advantageous.

On the other hand, it is also considered to be advantageous if the outer surface of the deviation element is rough with a roughness depth ranging between 2 and 4 micrometers.

Naturally, any other roughness depth, particularly lying in the range between 0.5 and 2 micrometers, can also be advantageous depending on the type of films.

In order to be able to guide a film web in a more improved fashion, the deviation element in an advantageous embodiment of the invention has variable characteristics along its axial extension.

In this way, the most uniform possible air cushion is created along this axial extension of the deviation element. It is thus possible, to have a variable roughness depth along this axial extension. Alternatively or even additionally, the geometrical dimensions of the deviation element can vary along this axial extension. Thus, for example, the outer surface of the deviation element can be at a variable distance from that axis of inertia of the deviation element that runs along this axial extension. If, for example, the deviation element is a roller, its diameter can be variable along the rotational axis of the roller. Different materials can also be used at different points of the deviation element.

Additional exemplary embodiments of the invention have been specified in the graphic description and the claims.

DETAILED DESCRIPTION OF THE PREFERRED EMBODIMENTS

Figure 1:
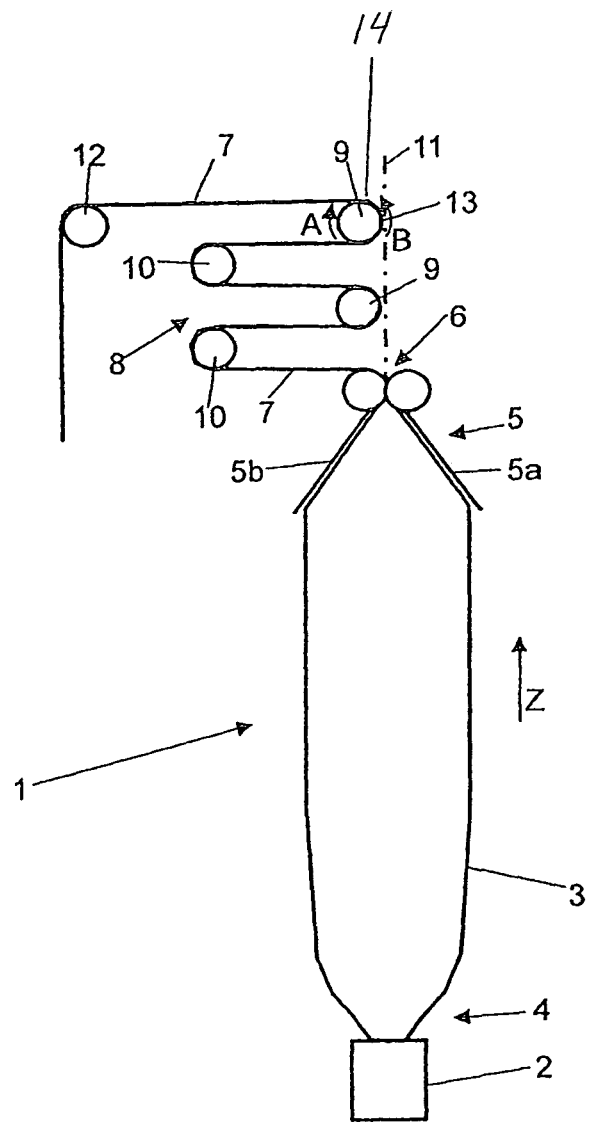
FIG. 1 is a schematic side view of a plant 1 used for producing films and comprising a deviation device of the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The plant 1 comprises a nozzle head 2, to which plastic melt is supplied. The plastic melt is distributed using distributors (not shown) into an annular channel, which opens into an annular nozzle at the upper end of the nozzle head 2. The plastic melt emerges from this nozzle in the transport direction "z," cools down on its route of transport and then forms a film tube 3. In the region 4 above the nozzle head 2, the plastic melt is not yet completely solid. The generation of excess pressure in the interior of the film tube 3 leads to the expansion of the film tube 3 in region 4. This expansion is also referred to as "stretching."

The film tube 3 is drawn off through a driven pair of take-off rollers 6 in the transport direction "z." Prior to this, the film tube 3 passes through a flattening device 5 comprising flattening plates 5a, 5b. The flattening device 5 creates a two-layer film web 7 from the film tube 3. The film web 7 is now supplied to a reversing device 8. The film web 7 can also be cut along its lateral edges in the vicinity of the pair of take-off rollers 6 in a manner not shown in the FIGURE, thus giving rise to two superimposed though no longer contiguous film webs after the drawing-off process. These film webs can then be supplied to two different reversing devices.

Figure 2:
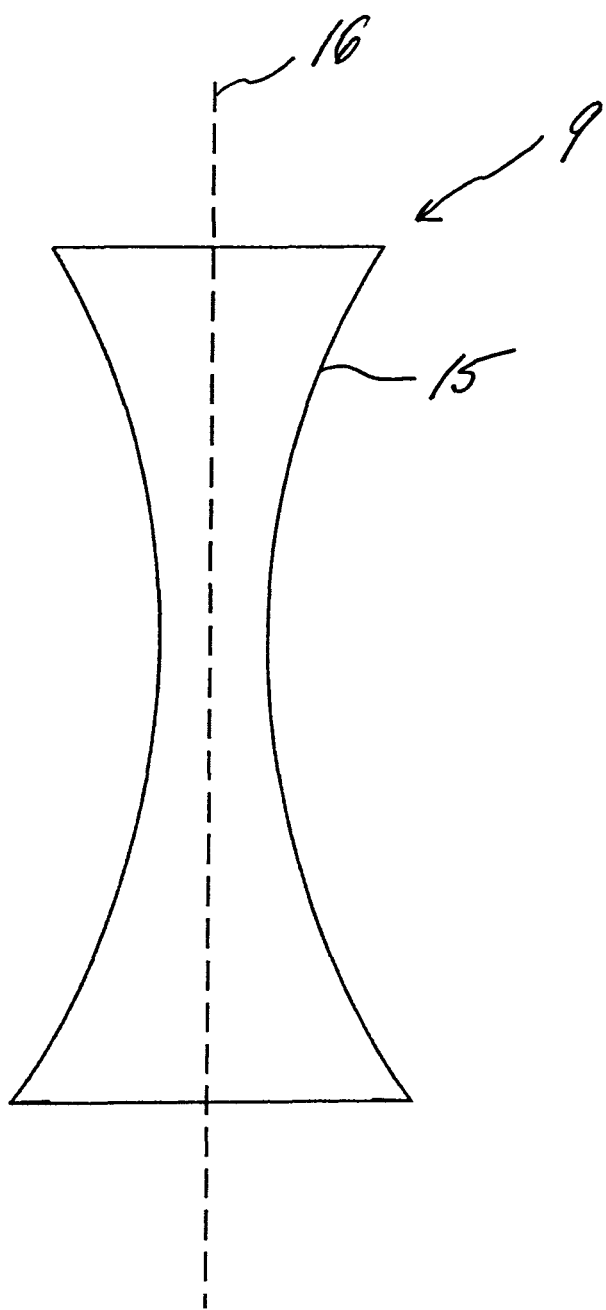
FIG. 2 is a schematic side view of a deviation element according to the invention.

Such a reversing device 8 comprises turning bars 9 and deflection rollers 10. The functioning and operating mode of such a reversing device 8 has been described by way of example in DE 100 40 055 A1 and hence will not be described here in detail. The reversing device 8 rotates about the reversing axis 11. After passing through the reversing device 8, the film web 7 is supplied using a deflection roller 12 to a device for further processing, which, for example, divides the two-layer film web 7 into several film webs and/or winds up the film web. In this exemplary embodiment, the reversing device 8 is designed as the deviation device of the invention. For this purpose, the turning bars 9 can be driven by means of a drive device (not shown). Alternatively or additionally, it is also possible to drive the deflection rollers 10. The arrow A indicates the direction of rotation of the turning bars 9. This direction of rotation is opposite to the transport direction B of the film web 7 at the point of deviation 13. The deflection roller 12 can also be driven similarly. As indicated above, if the deviation element (e.g., turning bar 9) is a roller, its diameter 15 can be variable along a rotational axis 16 of the roller. See FIG. 2.

Even though the deviation device of the invention in the exemplary embodiment illustrated is characterized by its use in the reversing drawing-off process, it must be pointed out here that deviation devices of the invention can be used in different components of the plants mentioned in the introduction. These components include particularly calibration devices, flattening devices, guiding devices, and winding devices. Deviation devices of the invention can also be used by way of example on printing machines, on other film-finishing machines and on film-processing machines. Here also, for example, guiding devices and winding devices are used for single-layer or even multi-layer film webs.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

| List of reference numerals | |
|---|---|
| 1 | Plant for film production |
| 2 | Nozzle head |
| 3 | Film tube |
| 4 | Region above the nozzle head 2 |
| 5 | Flattening device |
| 5a, 5b | Flattening plates |
| 6 | Pair of take-off rollers |
| 7 | Film web |
| 8 | Reversing device |
| 9 | Turning bar |
| 10 | Deflection roller |
| 11 | Reversing axis |
| 12 | Deflection roller |
| 13 | Point of deviation |
| A | Direction of rotation of turning bar 9 |
| B | Transport direction of the film web 7 at the point of deviation |
| z | Transport direction of the film tube |

What is claimed is:

1. A deviation device for a film web of a film-producing or film-processing plant, comprising:
at least one roller that operatively interacts with the film web at a point of deviation of the film web and guides the film web on an air cushion, the roller being axially rotatable about an axis thereof and including a drive device that sets the roller into rotation so that a peripheral speed of the roller differs from a transport speed of the film web so as to create the air cushion, a direction of rotation (A) of the roller being opposite to a transport direction (B) of the film web at the point of deviation, that the peripheral speed of the roller being greater than 30 m/s, and a maximum roughness depth of an outer surface of the roller being between 0.5 and 2 micrometers.

2. The deviation device according to claim 1, wherein the roller has an outer chromium layer.

3. The deviation device according to claim 1, wherein the outer surface of the roller has a variable roughness depth along an extension thereof directed transversely to the transport direction (B) of the film web.

4. The deviation device according to claim 1, wherein the peripheral speed of the roller is greater than the transport speed of the film web.

5. A method of deviating a film web of a film-producing or film-processing plant at a point of deviation by a roller, comprising:

guiding the film web at the point of deviation on an air cushion, the roller being set into axial rotation about an axis thereof so that a peripheral speed thereof differs from a transport speed of the film web so as to create the air cushion, a direction of rotation (A) of the roller being opposite to a transport direction (B) of the film web at the point of deviation with the peripheral speed of the roller being greater than 30 m/s, and a maximum roughness depth of an outer surface of the roller being between 0.5 and 2 micrometers.

6. The deviation device according to claim 5, wherein the roller has an outer chromium layer.

7. The method according to claim 5, wherein the outer surface of the roller has a variable roughness depth along an extension thereof directed transversely to the transport direction (B) of the film web.

8. A deviation device for a film web of a film-producing or film-processing plant, comprising:

a roller that operatively interacts with the film web at a point of deviation of the film web and guides the film web on a cushion of air, the roller having a smooth outer surface such that laminar flow is imparted to the air between the outer surface and the film web, the roller being drivably and axially rotatable such that a peripheral speed of the roller differs from a transport speed of the film web so as to create the cushion of air, a direction of rotation of the roller being opposite to a transport direction of the film web at the point of deviation, and wherein the smooth outer surface of the roller has a maximum roughness depth of 0.5 micrometers.

9. The deviation device according to claim 8, wherein the roller has an outer chromium layer.

\* \* \* \* \*